Figure 1:
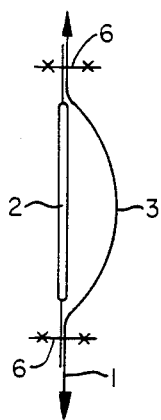

United States Patent [19]

Scholz et al.

[11] Patent Number: 4,556,236
[45] Date of Patent: Dec. 3, 1985

[54] INFLATABLE GAS CUSHION

[75] Inventors: Hans J. Scholz, Waldenbuch; Helmut Patzelt, Fellbach, both of Fed. Rep. of Germany

[73] Assignee: Daimler-Benz AG, Fed. Rep. of Germany

[21] Appl. No.: 534,826

[22] Filed: Sep. 22, 1983

[30] Foreign Application Priority Data

Sep. 23, 1982 [DE] Fed. Rep. of Germany ....... 3235176

[51] Int. Cl.$^4$ ............................................. B60R 21/08
[52] U.S. Cl. .................................................. 280/729
[58] Field of Search ...................... 280/728, 729, 737

[56] References Cited

U.S. PATENT DOCUMENTS

| | | | |
|---|---|---|---|
| 3,473,824 | 10/1969 | Carey et al. | 280/729 |
| 3,966,228 | 6/1976 | Neuman | 280/737 |
| 3,985,076 | 10/1976 | Schneiter et al. | 280/729 |
| 4,136,894 | 1/1979 | Ono et al. | 280/729 |

Primary Examiner—Richard A. Bertsch
Attorney, Agent, or Firm—Craig & Burns

[57] ABSTRACT

At least one closed container filled with neutralizing substances is arranged inside of an automatically inflatable gas cushion designed for the protection of the passengers of motor vehicles. The gas cushion is generally filled in a pyrotechnical manner by the use of gases and the release of the substances in the closed container is for the purpose of neutralizing these gases which may lead to the annoyance of the passengers when flowing into the vehicle passenger space.

9 Claims, 3 Drawing Figures

INFLATABLE GAS CUSHION

The present invention relates to an inflatable gas cushion for the protection of passengers of motor vehicles.

Such gas cushions at present are generally filled with a gas produced by a pyrotechnical propellant because of the short filling time which is available. Though these gases are non-poisonous, they frequently have an unpleasant odor and may lead to irritation in the nose and throat area when inhaled.

The present invention is concerned with the task of avoiding this disadvantage and eliminating the possibility as far as possible unpleasant side effects of the gas.

The underlying problems are solved according to the present invention in that at least one closed container filled with scenting or aromatic substances is arranged inside of the gas cushion which is automatically opened during the inflation operation.

The container is preferably constructed from plastic foil as a welded pocket which can be torn open relatively easily.

According to an advantageous construction of the present invention, the container is secured on the inside of the gas cushion in such a manner that it is mechanically destroyed by the unfolding gas cushion, i.e., in the case of a pocket, the pocket is torn open.

It may also be advantageous for the container to be constructed of material that is thermally destroyed by the hot gases flowing into the gas cushion, i.e., the pocket is melted.

Figure 2:
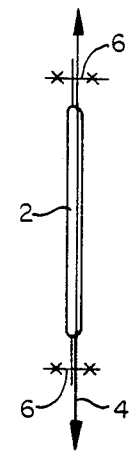
Figure 3:
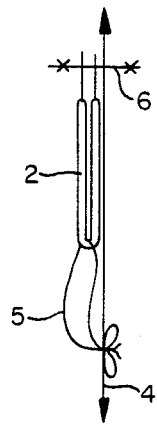

These and other objects, features and advantages of the present invention will become more apparent from the following description when taken in connection with the accompanying drawing which shows, for purposes of illustration only, several embodiments in accordance with the present invention, and wherein:

FIG. 1 is a somewhat schematic cross-sectional view through one embodiment in accordance with the present invention in which the container made from a foil is secured within the area of a fold of the gas cushion at the inner wall thereof;

FIG. 2 is a somewhat schematic cross-sectional view through a modified embodiment in accordance with the present invention, in which the container is secured at the inner wall of a gas cushion formed of elastic material; and FIG. 3 is a somewhat schematic cross-sectional view through a further embodiment in accordance with the present invention in which the container secured to the inner wall of an elastic gas cushion is provided with a tear-open thread.

Referring now to the drawing wherein like reference numerals are used throughout the various views to designate like parts, and more particularly to FIG. 1, an embodiment of the present invention is illustrated in this figure for a gas cushion 1 formed of relatively inelastic material, of which only a wall part is illustrated in this figure section-wise. A welded-together container 2 which is made from plastic foil or film is secured within the area of a fold 3 of the gas cushion 1 at the inner wall thereof by sewing, bonding, welding, or the like.

During the filling of the gas cushion 1, the fold 3 straightens out, the container 2 is torn open, and the substance contained therein, for example, in liquid or in powder form, which are matched specially to the gas filling the gas cushion in a manner known as such, neutralizes to reduce the annoying properties thereof.

In the embodiment of the present invention illustrated in FIG. 2 of the drawing, the container 2 is secured to a gas cushion 4 whose material is more stretchable than that of the container 2. No fold is necessary in this case because the material of the gas cushion 4 stretches during the filling thereof to such an extent that the container 2 is torn open, and its contents are released.

In the embodiment according to FIG. 3, the container 2 is secured, folded together to a gas cushion 4 formed of a material having good stretch properties i.e., an elastic cushion. A tear-open thread 5 is placed on the container 2 within the area of the fold and is secured to the gas cushion 4. During a corresponding stretching of the gas cushion 4, the container 2 is destroyed by the thread 5.

The places at which the container 2 is secured to the gas cushion 1, respectively, 4 are indicated schematically in the drawing by reference numeral 6.

A disposition of a container 2, according to FIGS. 1 to 3 of the drawing, would also be possible at inwardly disposed catching bands or straps or the like of the gas cushion or also on one side of fixed mounting parts and on the other to an unfolding part.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An inflatable gas cushion fillable with gases for the protection of passengers of vehicles including a frangible closed container means arranged inside of the gas cushion filled with substances for neutralizing selected properties of said gases, said container means being automatically opened during inflation of the inflatable gas cushion.

2. A gas cushion according to claim 1, wherein the container means is constructed as welded-together pocket made from a plastic foil.

3. A gas cushion according to claim 1, wherein the container means is secured inside of the gas cushion in such a manner that it is mechanically destroyed by the unfolding gas cushion.

4. A gas cushion according to claim 1, wherein the container means is thermally destroyed by hot gases flowing into the gas cushion.

5. An inflatable gas cushion fillable with gases for the protection of passengers of vehicles which is inflated by the gases flowing into the gas cushion during an accident, comprising a frangible closed container means inside the gas cushion, said container means being filled with substances for at least partially neutralizing any annoying side effects of said gases, said gas cushion automatically opening said closed container means during inflation of said gas cushion by said gases.

6. An inflatable gas cushion according to claim 5, wherein the gas cushion is made of stretchable material and the container means is opened mechanically.

7. An inflatable gas cushion according to claim 6, wherein said gas cushion and said container means utilize different stretch properties of the materials used therefor for automatically opening the container means during inflation of the gas cushion.

8. An inflatable gas cushion according to claim 6, wherein said gas cushion includes a member for tearing open said container means during inflation of the gas cushion.

9. An inflatable gas cushion according to claim 5, wherein said container means is formed of a thermally responsive material and is opened in response to hot gases filling said gas cushion.

* * * * *